Nov. 22, 1966　　　K. STEFFENS　　　3,287,163
ELECTRIC CELL

Filed Jan. 30, 1964　　　　　　　　　　2 Sheets-Sheet 1

INVENTOR
KARL　STEFFENS

Nov. 22, 1966 K. STEFFENS 3,287,163
ELECTRIC CELL

Filed Jan. 30, 1964 2 Sheets-Sheet 2

INVENTOR
KARL STEFFENS

United States Patent Office 3,287,163
Patented Nov. 22, 1966

1

3,287,163
ELECTRIC CELL
Karl Steffens, Hagen-Vorhalle, Germany, assignors to Varta Aktiengesellschaft, Hagen, Westphalia, Germany
Filed Jan. 30, 1964, Ser. No. 341,173
8 Claims. (Cl. 136—6)

This invention relates to an electric cell, particularly an electric storage battery cell, the electrodes of which are so constructed that those of the same polarity are connected in parallel by means of connecting bars.

It is an object of this invention to provide electrode arrangements which can be combined into complete electrode plate stacks without difficulty. In addition, this invention facilitates the assembly of electrode plate groups of opposite polarity including the inserted separators to produce a battery cell.

The problem has been solved according to this invention by providing slots at selected locations along at least one connecting bar between a pair of electrodes. The connecting bars of additional electrode pairs or the tabs of individual electrodes are inserted into these slots and fastened, for example by clamping, spotwelding, or a similar process.

Figure 1:
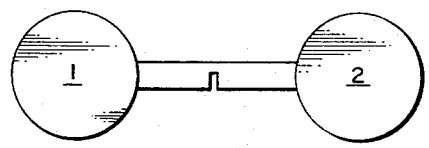
Figure 1:
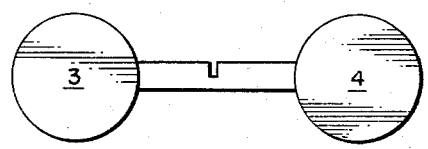
Figure 2:
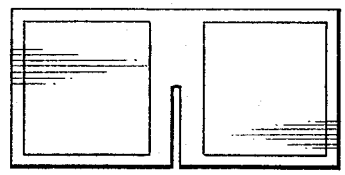
Figure 2:
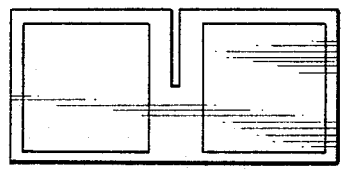
Figure 3:
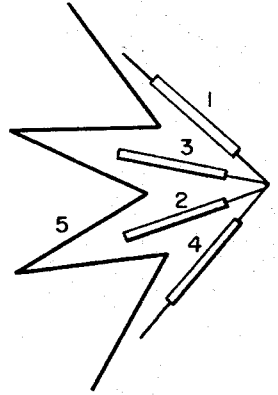
Figure 5:
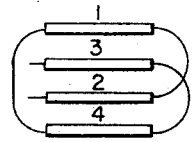
Figure 4:
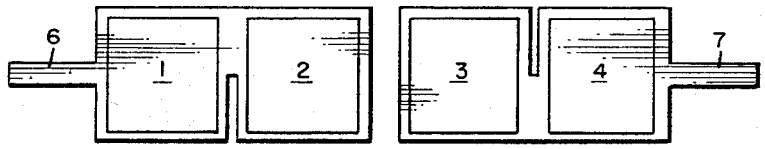
Figure 6:
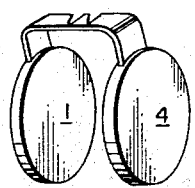
Figure 7:
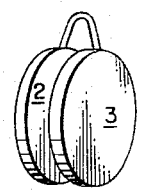
Figure 8:
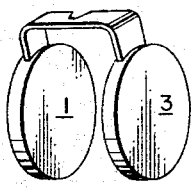
Figure 9:
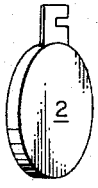
Figure 10:
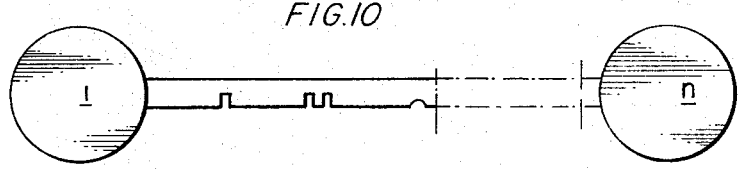
Figure 11:
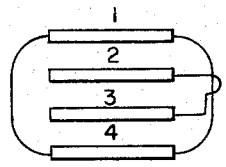

FIG. 1 shows a set of electrode pairs shaped as discs;
FIG. 2 illustrates a set of rectangular-shaped electrode pairs;
FIG. 3 functionally illustrates the assembly of electrode pairs and separator strip as a group into a cell construction;
FIG. 4 illustrates extending metal tabs on the end electrodes of a group;
FIG. 5 shows an electrode group where the interconnection is other than centrally on the connecting bar;
FIG. 6 shows an electrode pair with an indentation instead of a rectangular slot on the connecting bar;
FIG. 7 illustrates an electrode pair suitable for attachment to the indentation on the pair shown in FIG. 6;
FIG. 8 is another exemplary electrode pair;
FIG. 9 is an electrode plate suitable for attachment to the connecting bar between the pair shown in FIG. 8;
FIG. 10 shows an electrode pair with an elongated connecting bar to illustrate various manners in which interconnections can be made to the bar, and
FIG. 11 shows somewhat schematically plates which may be linked together other than centrally of the connecting bar.

FIGURES 1 and 2 show electrode pairs according to this invention. The bars respectively connecting electrode plates 1 and 2 and 3 and 4 are provided with slots to facilitate the connection of the electrode pairs of the same polarity by joining the connecting bars at their slots. After the electrodes have been thusly connected electrically in parallel, the electrode group is completed by bending the connecting bars so that the plates at least partially overlie one another.

The assembly of the plate groups into electric cells according to this invention is particularly simple. The current delivering surfaces of one plate group are covered by individual separators or by a separator strip 5 which has been folded in zigzag fashion as illustrated in FIGURE 3. A plate group of an opposite polarity is then assembled by interleafing one group with the other with the separator therebetween. The plate groups of opposite polarity may be joined in such a way that their respective connecting bars are placed at opposite sides of the corresponding completed electrode assembly.

As illustrated in FIGURE 4, a preferred embodiment of this invention provides for each of the end electrodes, 1 and 4, of a plate group, a metal tab, as at 6 and 7, which is attached to and projects from the edge opposite the connecting bar. The end electrodes are then connected to one another preferably by spotwelding the tabs together after the plate group has been formed and assembled with the separator as well as the plate group of the opposite polarity electrode. In this manner the compact assembly of the electrode plate elements is considerably simplified.

FIGURES 6 through 10 illustrates further embodiments of this invention. FIG. 5 shows an electrode pair 1, 4 having a connecting bar which is provided with rounded indentations instead of slots. In this case an electrode pair 2, 3, FIG. 7, having a connecting bar of round cross-section, such as a wire, which may be inserted in the rounded indentations.

FIGURES 8 and 9 show individual parts of a plate group, according to this invention, comprising an individual electrode 2 having a slotted tab of rectangular cross section which is to be inserted between the electrode pair 1, 3 at the slot in the connecting bar.

FIGURE 10 indicates how a plurality of electrodes may be attached to the connecting bar between an electrode pair 1, n to form a larger group of electrode plates. Various shapes of slots and indentations are shown to illustrate the many possibilities.

A special feature of this invention provides that there may be different lengths of the connecting bar portions between the respective electrode plates and slots. In other words, the slot need not be centrally located along the connecting bar. This feature is of particular advantage, for instance when the electrode plates are of different dimensions. FIGS. 5 and 11 show plate groups incorporating this novel feature. In the arrangement shown in FIG. 5, the electrodes 2 and 3 may be attached to shorter connecting bar portions than are electrodes 1 and 4. In the configuration illustrated in FIG. 11, the bar portion of electrode 2 may be shorter than that of electrode 3.

I claim:
1. An electric cell, particularly an electric storage battery cell, in which electrodes of the same polarity are connected in parallel to each other by connecting bars, at least one connecting bar between two electrodes being provided with a slot engaging the connecting bar of at least one additional electrode.

2. An electric cell according to claim 1, characterized by the slot-engaged connecting bar being fastened by spot welding.

3. In an electric cell, particularly an electric storage battery cell; at least two pairs of electrode plates, the two plates of each pair connected together by a slotted connecting bar, the connecting bars engaged at the slots and bent so that the group at least partly overlap one another to form a plate group.

4. An electric cell according to claim 3, characterized by the fact that one plate of each electrode pair is provided with a tab which is attached to the plate opposite the connecting bar with the tabs of a plate group fixedly attached to one another.

5. An electric cell as in claim 3 characterized by the connecting bars being spot welded together at the engaging slots.

6. An electric cell as in claim 4 characterized by the connecting bars and the tabs being spot welded together where attached.

7. An electric cell as in claim 4 characterized by the connecting bar slots being other than centrally located between the plates.

8. An electric cell according to claim 4 further including a second electrode plate group with the plates interleaved with those of the first plate group.

References Cited by the Examiner

UNITED STATES PATENTS

| | | | |
|---|---|---|---|
| 2,971,999 | 2/1961 | Jacquier | 136—111 X |
| 3,169,889 | 2/1965 | Zahn | 136—6 |

WINSTON A. DOUGLAS, *Primary Examiner.*

D. L. WALTON, *Assistant Examiner.*